Nov. 24, 1953    E. LEITZ, JR., ET AL    2,660,090
PRISM SYSTEM FOR BINOCULAR MICROSCOPES
Filed July 12, 1949    3 Sheets-Sheet 1

INVENTORS
ERNST LEITZ JR.
MAX ENGELMANN
AUGUST BROHL
BY
ATTORNEY

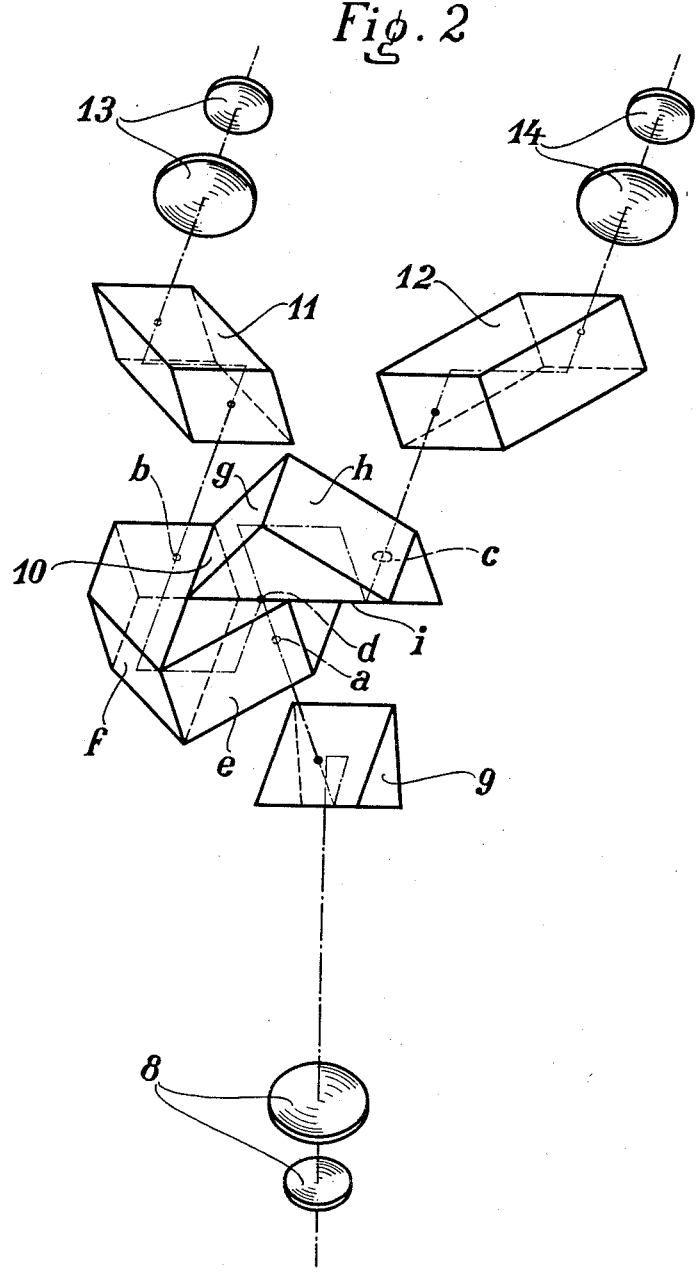

Nov. 24, 1953
E. LEITZ, JR., ET AL
2,660,090
PRISM SYSTEM FOR BINOCULAR MICROSCOPES
Filed July 12, 1949
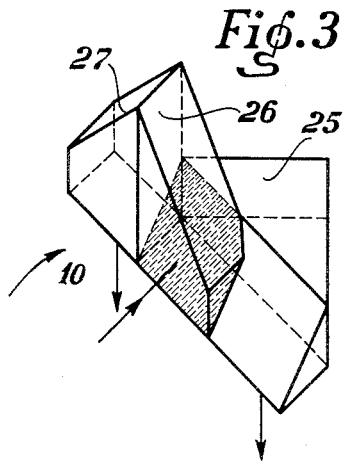
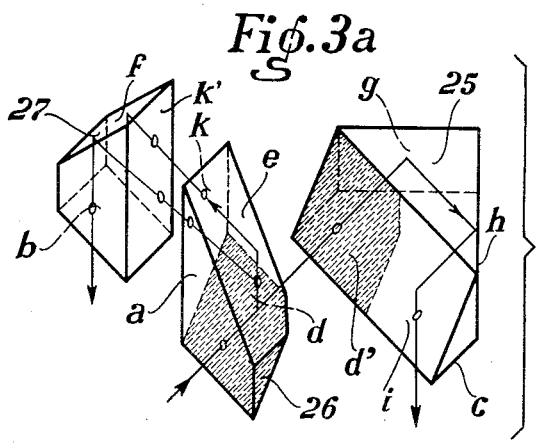
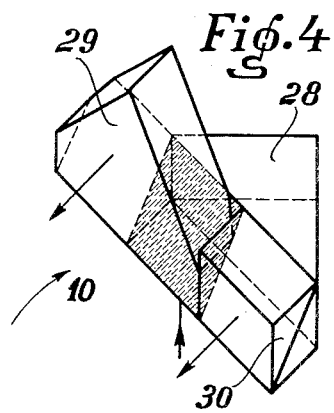
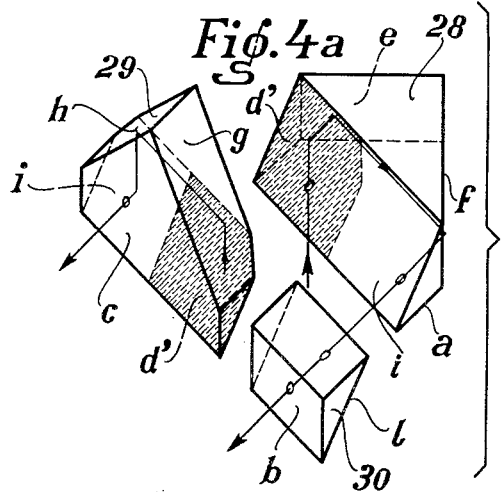
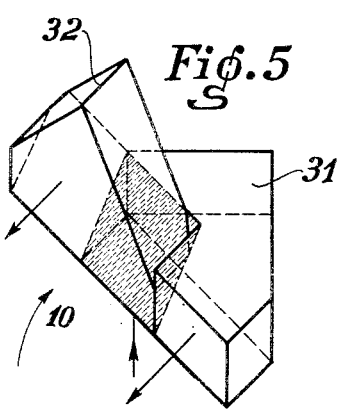
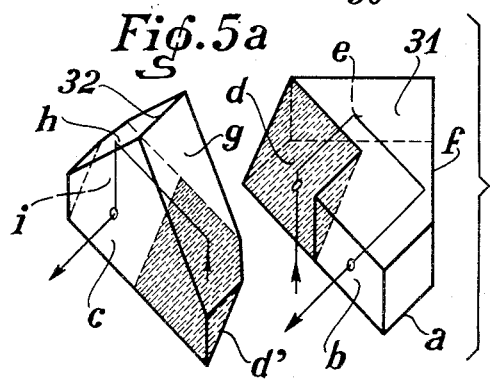
INVENTORS:
ERNST LEITZ JR
MAX ENGELMANN
AUGUST BROHL
BY *Klein & Hart*
ATTORNEYS Patented Nov. 24, 1953

2,660,090

UNITED STATES PATENT OFFICE 2,660,090

PRISM SYSTEM FOR BINOCULAR MICROSCOPES

Ernst Leitz, Jr., Max Engelmann, and August Bröhl, Wetzlar, Germany, assignors to Ernst Leitz, G. m. b. H., Wetzlar, Germany, a corporation of Germany Application July 12, 1949, Serial No. 104,244

Claims priority, application Germany November 1, 1948

4 Claims. (Cl. 88—39)

This invention relates to prism sets or systems adapted to divide a light beam and to erect an image for use in image erecting binocular tubes for microscopes.

It is an object of the present invention to provide a compact prism structure wherein the prisms are easily positioned within the apparatus and are simply adjusted.

It is a more specific object of this invention to provide a prism binocular adapted to erect an image under a viewing angle of 45° in respect to the direction of the light beam from the objective, the set of deviating and erecting prisms being efficiently and compactly constructed.

It is a main feature of the invention to provide a set of prisms adapted to divide a light beam coming from an objective, wherein the effective image erecting members of one beam represent a first Porro prism system, the effective image erecting members of the other beam represent a second Porro prism system, and one of the reflecting surfaces of one of said Porro systems also constitutes the beam dividing surface. The first Porro system, referred to throughout this specification, is an image erecting system of isosceles rectangular prisms comprising two pairs of angularly arranged intersecting reflecting surfaces, each pair, respectively, longitudinally inverting or laterally reversing the image by 180°. The second Porro system, referred to throughout this specification, is an image erecting system of isosceles rectangular prisms arranged to cause four reflections, each deflecting the impinging beam by 90° in such a manner that the reflected image is longitudinally inverted and laterally reversed by 90°, after the second reflection, and by 180°, after the fourth reflection, the inversions and reversions taking place in the same sense.

In a set of prisms according to the invention, the optical length of the two beam paths may be equalized simply by adding a glass body at the emergence of that beam which traverses the shorter optical path in the prism set. A direct vision set of prisms may be converted into an angular vision set of prisms by making the reflecting surface common to both Porro systems also the reflecting surface of a further prism designed to deviate the beam by the desired angle, such as a Schmidt prism. A Schmidt prism is an isosceles triangular prism having three reflecting surfaces of which two are inclined to each other at an angle of 45°, the light impinging upon one and emerging from the other of the two surfaces (see Fig. 5 and the corresponding description of British Patent No. 11,556/1899).

The latter construction results in a set of prisms adapted to divide a beam and erect an image, the angle of the emerging beams being displaced 45° in respect to the angle of incidence. This arrangement has the advantage that it may comprise an entrance prism in optical series with a compact prism body, suitably cemented together, the entire system consuming a minimum of space. By incorporating the first reflecting surface common to both Porro systems (which are comprised in the prism body) in the entrance prism, the erection of the image is divided so that the vertical erection takes place in the first prism while the horizontal erection of the image is effected in the prism body. The prism body itself becomes a set of angular vision prisms by removal of the first reflecting surface therefrom, the angle of deviation in respect to the angle of incidence being 90°.

According to the invention, the reflecting surfaces in the prism body following the entrance reflecting surface common to both Porro systems are so arranged that the entering beam which is reflected from the partly reflecting surface is reflected twice more, while the beam passing through the partly reflecting surface is reflected three times more in the system.

With prism bodies as described above, it is simple to construct binoculars for microscopes in accordance with the invention, said binoculars being adapted to give a complete erection of the image under deviation of the emergent beams of 45° in respect to the angle of incidence. In such an image erecting tube the light from the objective first enters a Schmidt prism where it is deviated at an angle of 90° with respect to the optical axis of the binocular tubes and from where it is reflected to the prism body. The light beam is then divided in the prism body and the two emerging rays are passed through two rhomboidal prisms which are adjustable to lead the two beams to the eyepieces.

The various features and objects of the present invention will become more apparent from the following description of various embodiments thereof taken in conjunction with the drawings, in which:

Fig. 2 shows a schematic perspective view of the optical system of the microscope;

Figs. 3 and 3a show an 11-surface prism body in assembled and exploded views, respectively;

Figs. 4 and 4a show a 10-surface prism body in assembled and exploded views, respectively; and Figs. 5 and 5a show a 9-surface prism body in assembled and exploded views, respectively.

Figure 1:
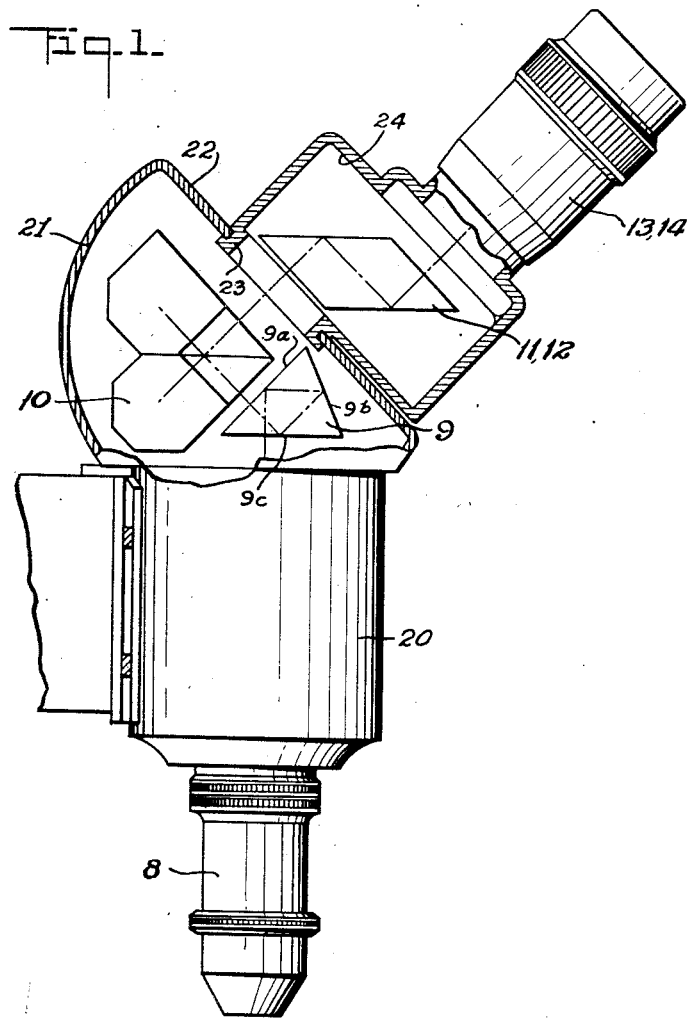
Fig. 1 shows an image erecting tube inclined 45°, using a prism body in conjunction with a Schmidt's prism in accordance with the invention.

Referring now to Fig. 1, there is shown a binocular microscope having an objective 8 and a microscope tube 20. The light beam coming from the objective is first erected longitudinally in Schmidt prism 9 by its three reflecting surfaces 9a, 9b and 9c and is deviated 45° and oppositely to the finally desired deviation. The beam emerging from surface 9a is divided and laterally erected in schematically shown prism body 10, specific preferred constructions of which are illustrated in Figs. 3-5. The beam emerges from prism body 10 inclined 90° with respect to the angle of incidence so that the angle of the emerging beams is 45° with respect to the horizontal. Prism 9 and prism body 10 are fixedly mounted in housing 21 which is connected with tube 20 and has a wall 22. Two housings 24 with bearings 23 are rotatably mounted on wall 22, each housing 24 having arranged therein rhomboidal prisms 11 and 12, respectively. The beams enter the respective rhomboidal prisms from prism body 10 and are carried by the rhomboidal prisms to eyepieces 13, 14. Housings 24 with their prisms are pivotable around the optical axis of the divided beams in a manner known per se to adjust the ocular distance to the eye distance of the operator.

Fig. 2 shows the path of the light beam through the optical system of the microscope from objective 8 to eyepieces 13 and 14. The beam enters Schmidt prism 9, is thrice reflected therein, as also shown in Fig. 1, and leaves the Schmidt prism to enter prism body 10 through incidence surface a. From surface a the beam travels to dividing surface d, one part of the beam continuing through surface d and being thrice reflected by surfaces g, h and i to leave the prism body by emergence surface c, while the other part of the beam is reflected by surface d and is twice reflected by surfaces e and f to leave the prism body by emergence surface b. The beam from surface b enters rhomboidal prism 11 and that from surface c enters rhomboidal prism 12.

The unitary prism body 10 may be formed from its constituent members in different ways, the number of polished surfaces varying with the kind of construction. It is merely necessary that the reflecting surfaces following the first reflecting surface common to both Porro systems be so arranged that the entering beam reflected from the partly reflecting surface is reflected twice more in the one Porro system, while the beam passing through the partly reflecting surface is reflected three times more in the other Porro system.

The 11-surface prism body of Fig. 3 has equally long light paths for both beams and comprises three members 25, 26 and 27. The members are cemented together at four surfaces (i. e. at two surfaces d, k of one member and at one surface d', k' each of the two other members), two of said surfaces d, d' being cemented partly reflecting. The prism body comprises a rectangular isosceles prism 25 having its hypotenuse d', i inclined 45° with respect to the side surfaces c and about one half thereof (d') being partly reflecting, and a second Porro prism set 26, 27 arranged perpendicularly to one side of said rectangular prism, the first reflecting surface d of said second Porro prism being cemented to the partly reflecting half d' of the hypotenuse of the first rectangular prism 25, the last reflecting surface of the second Porro prism being omitted, and a member 27 being provided in place thereof which equalizes the optical paths of both beams. In this embodiment of our invention the prism body 10 comprises eleven polished surfaces, of which seven are reflecting surfaces and four are transparent surfaces, the beam dividing surface counting as two reflecting surfaces.

The 10-surface prism body of Fig. 4 has also equally long light paths for both beams and comprises two like four-surface prisms 28 and 29, prism 28 being similar to prism 25, and one two-surface prism 30. The members are cemented together at four surfaces, the two congruent surfaces d, d' of the like prisms 28 and 29 being cemented together partly reflecting. The prism body has ten polished surfaces and comprises two rectangular isosceles prisms 28 and 29 whose hypotenuse faces d', i are inclined 45° with respect to the corresponding side surfaces. The hypotenuse-forming surfaces are longitudinally displaced against each other substantially half way and the reflecting halves d' are cemented together whereby the two prisms are perpendicular to each other. The free half i of the hypotenuse of rectangular prism 28 is so united with the hypotenuse of a further isosceles rectangular prism 30 that the beam entering said hypotenuse is not further deviated. This embodiment has six reflecting surfaces and four transparent surfaces, the dividing surface again counting as two reflecting surfaces.

The 9-surface prism body of Fig. 5 comprises only two prisms 31 and 32, prism 32 being similar to prism 29, cemented together perpendicularly and has two surfaces d, d' cemented together partly reflecting. The lengths of both light paths are again the same. The prism body consists of a rectangular isosceles prism 31 having part d of its hypotenuse inclined 45° with respect to the side surface a thereof and corresponding substantially to a perpendicular projection of a side surface e. This part d of the hypotenuse is partly reflecting and is cemented to a further rectangular isosceles prism 32 so that the two prisms are perpendicular to each other and are displaced relative to each other by about half the length of the hypotenuse.

The reference letters designating prism surfaces of like function are the same in Figs. 3-5.

While the invention has been described with reference to the various embodiments shown in the drawings, it is to be understood that the same have been given merely for the purpose of illustration and not as a limitation upon the spirit and scope of the invention as defined in the objects and in the appended claims.

We claim:

1. In a microscope comprising an objective, a microscope tube having a first housing, two additional housings rotatably connected with the first housing, two rhomboidal prisms arranged in the two additional housings, and two eyepieces adapted to be adjusted to a desired eye distance by rotation of the two housings: the combination of a Schmidt's prism and a compact glass body constituting a cemented prism system, said combination being arranged between the objective and the rhomboidal prisms, said Schmidt's prism having three reflecting surfaces which vertically erect and deviate by 45° with respect to the optical axis of the objective the image emerging from the objective, and said cemented prism system having one beam incidence surface and two beam emergence surfaces, a beam dividing surface arranged behind the beam incidence surface, said beam dividing surface dividing the beam emerging from said Schmidt's prism into two beams which proceed in perpendicular planes, and three reflecting surfaces in the path of each of said two beams in a spacial arrangement of the type of a Porro system, the Porro system in one of said paths being without a first and the Porro system in the other of said paths being without a last reflecting surface, said reflecting surfaces erecting the image emerging from the objective laterally and projecting it onto the rhomboidal prisms while simultaneously deviating the two beams emerging from the prism system by 90° with respect to the beams entering the prism system from the Schmidt's prism.

2. A binocular microscope as defined in claim 1, wherein said compact prism system comprises a rectangular isosceles prism with three reflecting surfaces having its hypotenuse surface inclined 45° with respect to the side surface; a second prism having a beam emerging surface and a pair of angularly arranged intersecting reflecting surfaces, one of said reflecting surfaces being cemented to a half of said hypotenuse surface and including between said two cemented surfaces a partly reflecting mirror; and a third prism being cemented to the beam emerging surface of the twice-reflecting prism and having one reflecting surface and a glass path equalizing the optical paths of the beams passing through said prism system.

3. A binocular microscope as defined in claim 1, wherein said compact prism system comprises two rectangular isosceles prisms having their hypotenuse surfaces inclined 45° with respect to their respective side surfaces, said hypotenuse surfaces being longitudinally displaced relative to each other about one half of their lengths and one of the overlapping halves having a partly reflecting mirror, the said prisms being cemented to each other in such manner that they are perpendicular to each other, the partly reflecting surface serving as a dividing surface for a beam impinging thereon; and a third rectangular isosceles prism having its hypotenuse surface cemented to the free half of that rectangular prism which receives the part of said beam reflected from said dividing surface, said third prism being arranged so that the beam passing through its hypotenuse surface is not deviated therein.

4. A binocular microscope as defined in claim 1, wherein said compact prism system comprises a rectangular isosceles prism having part of its hypotenuse surface inclined 45° with respect to a side surface, said part of the hypotenuse surface corresponding approximately to a perpendicular projection of a side surface on the hypotenuse surface; and a second prism having its hypotenuse surface inclined 45° with respect to its side surface, the said inclined part of the first-named hypotenuse surface and one half of said second hypotenuse surface including a partly reflecting mirror, the said two prisms being cemented to each other in such manner that they are perpendicular to each other.

ERNST LEITZ, JR.
MAX ENGELMANN.
AUGUST BRÖHL.

References Cited in the file of this patent

UNITED STATES PATENTS

| Number | Name | Date |
| --- | --- | --- |
| 1,650,646 | Ott | Nov. 29, 1927 |
| 1,807,613 | Bauersfeld et al. | June 2, 1931 |
| 1,853,674 | Engelmann | Apr. 12, 1932 |
| 1,900,241 | Konig | Mar. 7, 1933 |
| 2,087,329 | Ott | July 20, 1937 |
| 2,380,469 | Schmarion | July 31, 1945 |
| 2,472,600 | Luboshez | June 7, 1949 |

FOREIGN PATENTS

| Number | Country | Date |
| --- | --- | --- |
| 11,556 | Great Britain | of 1899 |
| 217,769 | Germany | Jan. 12, 1910 |